US 6,658,834 B1

(12) United States Patent
Mayo

(10) Patent No.: US 6,658,834 B1
(45) Date of Patent: Dec. 9, 2003

(54) AGRICULTURAL HARVESTER HAVING AUTOMATED TREE SENSING AND SHAKING DEVICE AND METHOD

(75) Inventor: Donald P. Mayo, Live Oak, CA (US)

(73) Assignee: Orchard Machinery Corporation, Yuba City, CA (US)

( * ) Notice: Subject to any disclaimer, the term of this patent is extended or adjusted under 35 U.S.C. 154(b) by 0 days.

(21) Appl. No.: 10/198,529

(22) Filed: Jul. 17, 2002

(51) Int. Cl.$^7$ ............................................. A01D 46/00
(52) U.S. Cl. .................................. 56/340.1; 56/10.2 R
(58) Field of Search ................... 56/1, 10.2 R, 10.2 A, 56/10.2 D, 10.2 F, 328.1, 329, 340.1, DIG. 9, DIG. 10

(56) References Cited

U.S. PATENT DOCUMENTS

| | | | | |
|---|---|---|---|---|
| 3,163,458 A | * | 12/1964 | Brandt, Jr. ..................... | 294/88 |
| 4,128,986 A | * | 12/1978 | Santarelli ..................... | 56/340.1 |
| 5,103,625 A | * | 4/1992 | McCrill ........................ | 56/340.1 |
| 5,473,875 A | * | 12/1995 | Zehavi et al. ............... | 56/340.1 |
| 5,595,054 A | * | 1/1997 | Reynolds de Sousa et al. ................................................... | 56/340.1 |

* cited by examiner

Primary Examiner—Robert E. Pezzuto
(74) Attorney, Agent, or Firm—Robert O. Guillot; IPLO Intellectual Property Law Offices

(57) ABSTRACT

A tree harvester including an automated tree sensing and shaking control system. The control system includes a tree sensing device, such as an ultrasonic sensor that is mounted upon the harvester. Predetermined tree distance values and other shaker head control parameters are input into a programmable logic control (PLC) device of the control system. When the harvester is located next to a tree, the operator initiates an automated tree shaking cycle in which the tree sensor provides distance values to the tree as input signals to the controller. The shaker head automatically moves outward towards the tree until the inputted distance values to the tree are equal to or less than the predetermined tree distance values. The control system then causes the shaker head to clamp the tree, to shake the tree, to unclamp the tree and to move the shaker head back to the harvester.

16 Claims, 3 Drawing Sheets

AGRICULTURAL HARVESTER HAVING AUTOMATED TREE SENSING AND SHAKING DEVICE AND METHOD

BACKGROUND OF THE INVENTION

1. Field of the Invention

The present invention and relates generally to mechanized agricultural tree harvesters that utilize shaker heads to shake fruit and nut trees, and more particularly to such a harvester having a tree sensing device and a related system that automatically detects, clamps and shakes trees.

2. Description of the Prior Art

Tree harvesters for shaking nut and fruit trees to cause nuts or fruit-to drop to the ground for harvesting to are well known in the prior art. R. W. Brandt, Jr. was a prolific inventor in this field and his U.S. Pat. Nos. 3,163,458; 3,220,268; 3,221,567; and 3,318,629 describe various features of tree harvesters and shaker heads that are still used in current devices. A harvester having an apparatus for cooling shaker heads is described in U.S. Pat. No. 5,103,625 issued to Kenneth L. McCrill.

When the harvest time of a particular crop occurs, thousands of trees in orchards become ripe at the same time. The shaking of these thousands of trees is a time consuming process, that must be completed quickly, and it is therefore advantageous to create systems that complete the tree shaking operation as quickly as possible, such that more trees can be harvested more rapidly while the crop is ripe and before it becomes over ripe and then spoiled. The present invention is an automation of the tree harvester shaking process, and it includes a tree sensing device along with a system for automatically deploying the shaking head, clamping the tree, shaking the tree, releasing the tree and returning the shaker head to the harvester.

SUMMARY OF THE INVENTION

The tree harvester of the present invention includes an automated tree sensing and shaking control system that is incorporated into a prior art tree harvester. Such harvesters generally operate by being driven to a location proximate a tree to be harvested, and extending a shaker head having tree clamping pads towards the tree. The shaker head includes movable jaws that clamp the tree and a shaker head motor is then activated to shake the tree. Thereafter, the jaws are released to unclamp the tree and the shaker head is moved back to the harvester, which is then driven to the next tree whereupon the shaking process is repeated.

In the present invention a tree sensing device, such as an ultrasonic sensor, is mounted upon the harvester, preferably though not necessarily upon the shaker head. Predetermined tree distance values and other shaker head control parameters are input into a programmable logic control (PLC) device of the control system. When the harvester is driven to a location next to a tree, the operator initiates an automated tree shaking cycle in which the tree sensor locates the tree and provides distance values to the tree as input signals to the controller. The controller compares the distance values to the tree with the predetermined tree distance value and provides shaker head control signals that cause the shaker head to automatically move outward towards the tree. The shaker head outward motion is halted when the inputted distance values to the tree are equal to or less than the predetermined tree distance values. The control system then provides control signals to the shaker head components to cause the shaker head to clamp the tree, to shake the tree, to unclamp the tree and to move the shaker head back to the harvester. Further control input signals to the controller include engine RPM signals for controlling the engine RPM and tree shaking time signals for controlling the duration of the tree shaking step. The present invention has proven to be generally more rapid and more efficient in harvesting a tree orchard than an operator controlled harvester.

It is an advantage of the harvester of the present invention that it includes an automated tree shaking cycle.

It is another advantage of the harvester of the present invention that it includes a control system and a tree sensing device that provides tree distance values for controlling the shaker head movement towards a tree.

It is a further advantage of the harvester of the present invention that it includes a programmable logic control (PLC) device that receives predetermined tree shaking process variables, and which compares the predetermined process variables with input signal values to provide output control signals to various components of the harvester to automatically control the tree shaking process.

It is yet another advantage of the present invention that it includes an automatic tree locating and shaking system that shakes trees in an orchard more rapidly and efficiently than a human operator.

These and other features and advantages of the present invention will no doubt become apparent to those skilled in the art upon reading the following detailed description which makes reference to the several figures of the drawings.

IN THE DRAWING

DESCRIPTION OF THE PREFERRED EMBODIMENTS

Figure 1:
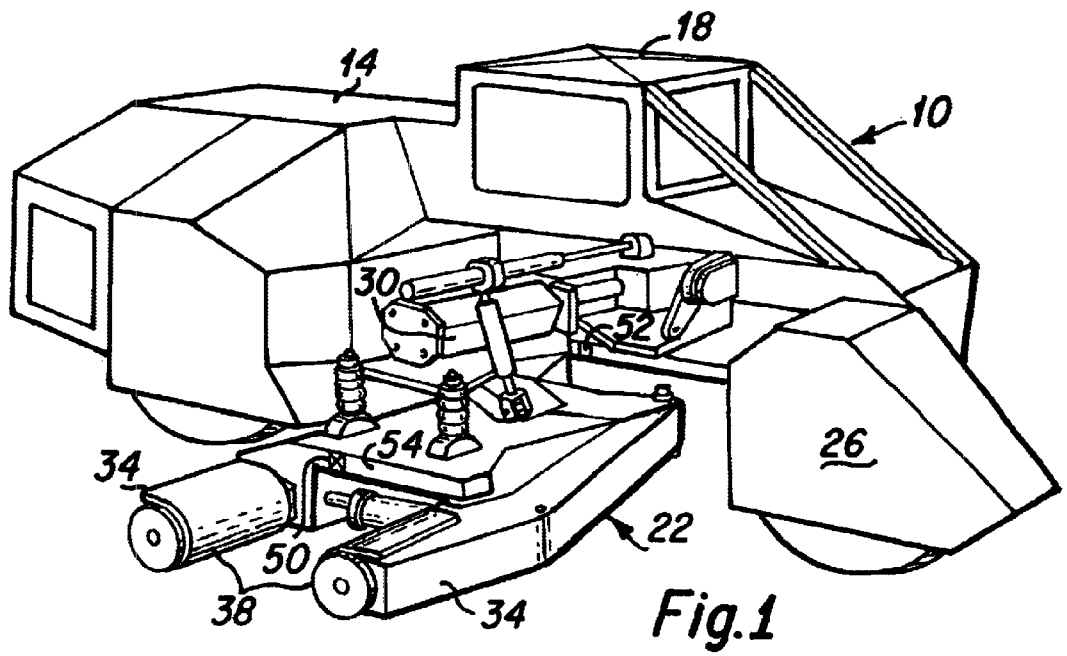
FIG. 1 is a perspective view of a tree harvester including an automatic tree sensing device and system of the present invention.
Figure 2:
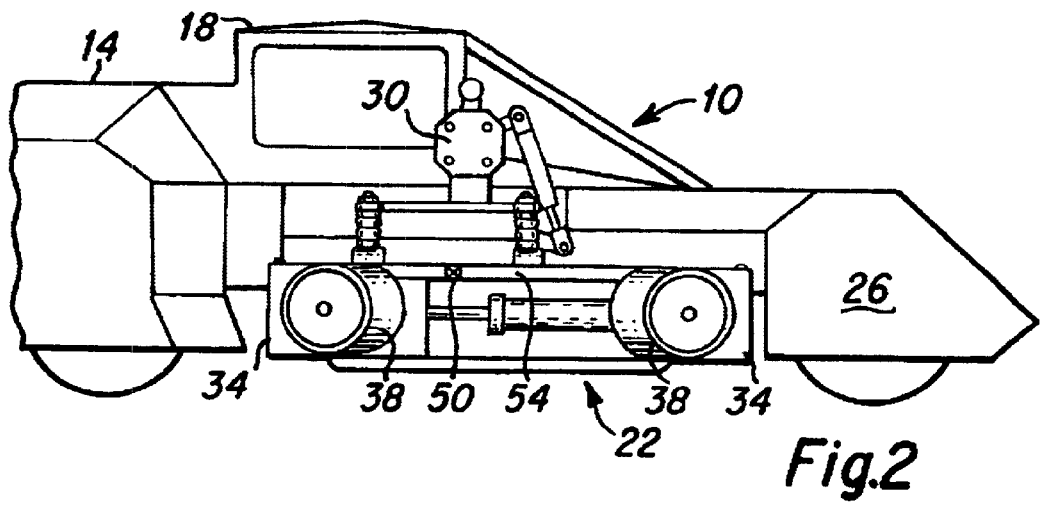
FIG. 2 is a side elevational view of the harvester depicted in FIG. 1.
Figure 3:
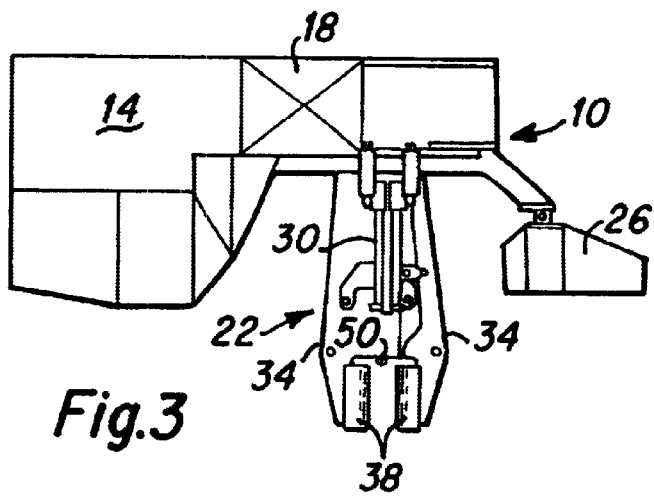
FIG. 3 is a top plan view of the harvester depicted in FIGS. 1 and 2.

Tree shaking devices, termed harvesters herein, for harvesting fruit and nut trees are widely used in the agricultural industry. FIGS. 1–3 depict a well known harvester that is improved by the inclusion of the automatic tree sensing and shaking system of the present invention, wherein FIG. 1 is a perspective of view of the harvester, FIG. 2 is a side elevational view thereof, and FIG. 3 is a top plan view thereof. As depicted in FIGS. 1–3, the harvester 10 includes a body 14 enclosing a drive engine, a forwardly disposed operator's cab 18, a tree clamping and shaking head 22 that is mounted to the body 14 such that the operator can view the tree clamping and shaking process, and a single front steering wheel 26 for maneuvering the harvester 10. The shaker head 22 is movably mounted upon an outwardly projecting support boom 30, such that the harvester can be positioned next to a tree and the shaker head 22 then moved outwardly to clamp and shake the tree. The shaker head 22 includes two jaws 34 having shaking pads 38 that are used to clamp and shake the tree. All of these structures and features are well known and utilized in prior art harvesters, and the present invention is an improvement therein, as is next discussed.

In the present invention, a tree sensor 50 is mounted on the harvester 10 to automatically detect the presence and location of a tree relative to the shaker head position, and to automatically provide data related to the distance between the shaker head and the tree. As is described in detail hereinbelow, when the tree sensor data indicates that the shaker head has been deployed and is properly located relative to the tree, the shaker head clamping and shaking cycle is automatically initiated to shake the tree. After the clamping and shaking cycle is complete, the tree is released and the shaker head is automatically retracted until it trips a limit switch 52 that is located on the body 14. The driver then drives the harvester to the next tree and the automatic tree sensing and shaking cycle is repeated on that tree. In the preferred embodiment, the tree sensor is mounted upon the outward structure 54 of the shaker head 22, generally above and between the tree shaking pads 38. However, the present invention is not to be limited to such a location, as those skilled in the art can no doubt find various locations that will adequately function. A full description of the tree sensing and shaking device and method of the present invention is next presented with the aid of the top plan view depictions of FIGS. 4 and 6–9 and the control system diagram of FIG. 5.

Figure 4:
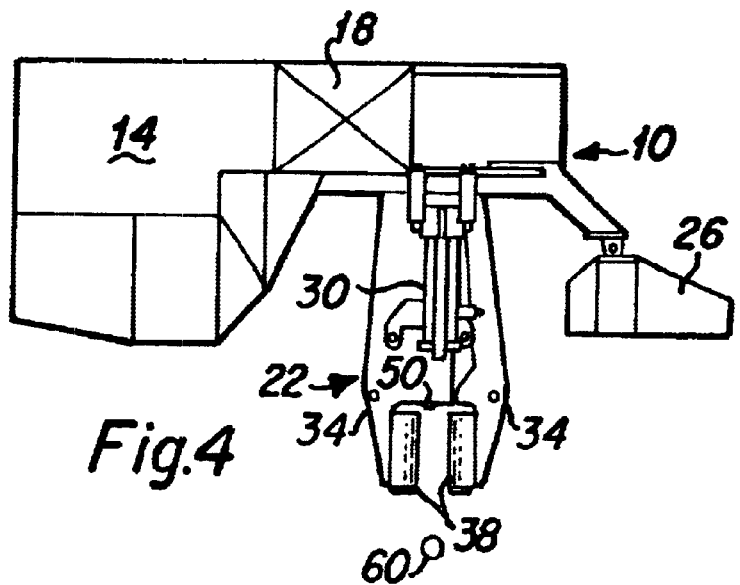
FIGS. 4 and 6–9 are top plan views depicting the tree shaking cycle utilizing the tree sensing and shaking system of the present invention.

FIG. 4 depicts a tree harvester 10 of the present invention that has been driven by the operator to a position next to a tree 60 to be shaken, such that the shaker head is configured with the shaker pads open and the tree 60 outboard of the shaker head 22 and generally aligned between the pads 38. At this point the automatic tree sensing and shaking apparatus and system of the present invention is ready for activation, and the operator can activate it by generating an electrical activation signal, such as by depressing a start button or a trigger or the like.

Figure 5:
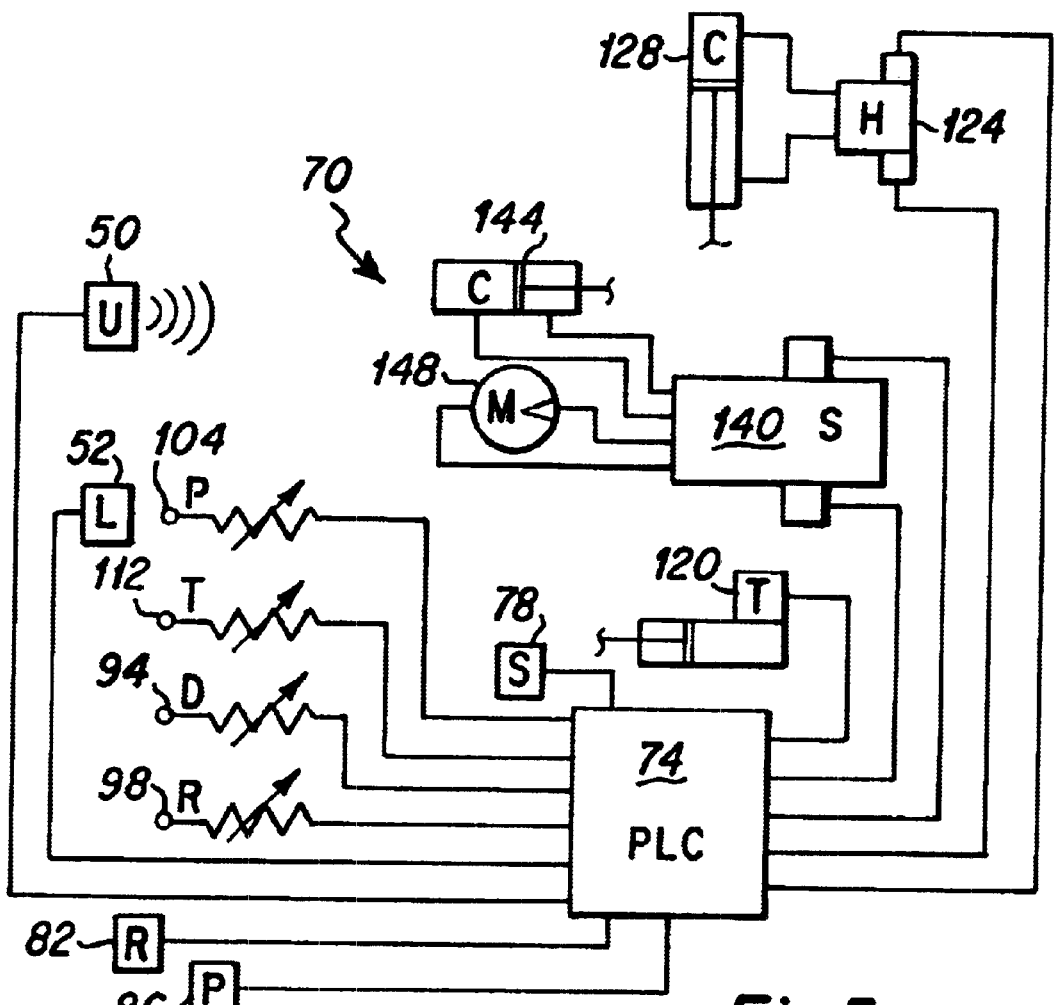
FIG. 5 is a schematic diagram of the tree sensing and shaking system of the present invention.

With reference to the control system schematic diagram of FIG. 5, a preferred embodiment of the present invention utilizes a control system 70 including programmable logic control device (PLC) 74 with associated electronic and hydraulic systems to automatically control the tree sensing and shaking process. The PLC receives input signals from the start button 78, the tree sensor 50, an engine RPM sensor 82, a shaker head clamping pressure sensor 86 and the shaker head initial position limit switch 52. Predetermined programmable values, such as can be generated by potentiometer devices, including a predetermined tree distance value potentiometer 94, one or more predetermined engine RPM value potentiometers 98, a predetermined clamping pressure value potentiometer 104 and a predetermined shaking time value potentiometer 112, are input into the PLC. Output control signals from the PLC are provided to an engine RPM throttle servo 120, one or more shaker head hydraulic fluid control valves 124 that supply hydraulic fluid to hydraulic cylinders 128 that control the inward and outward motion of the shaker head 22, and a shaker head manifold 140 having hydraulic control valves that supply hydraulic fluid to shaker head clamping hydraulic cylinders 144, and which provides electrical signals to one or more shaker head shaking motors 148. It is to be understood that the present invention is not to be limited to the detailed features of any particular control system, such as that depicted in FIG. 5, such as other types of control systems that may use other types of input devices than potentiometers to provide predetermined values to the system. It is thus to be understood that the basic features of the present invention can no doubt be accomplished by those skilled in the art utilizing other and different control systems that nevertheless achieve equivalents to the basic control features of the present invention.

When the operator commences the tree shaking cycle, the engine RPM is raised to generate the hydraulic fluid pressure necessary to control and operate the shaker head. To accomplish this, predetermined engine RPM values from potentiometer 98 are programmed into the PLC, and the PLC receives engine RPM input signals 82 that are compared to the predetermined engine RPM values within the PLC, and an output signal from the PLC controls a throttle servo 120 to automatically adjust the engine RPM to obtain the desired determined value.

At this time the PLC also receives input signals from the tree sensor 50, which, in the preferred embodiment is an ultrasonic sensor, such as the Model Q45 Ultrasonic Sensor manufactured by Banner Engineering Corp., Minneapolis, Minn. Other sensors, such as laser and/or photoelectric sensors are utilizable, however in the dirty, dusty environment in which the harvester operates, the ultrasonic sensor has proved to be more reliable. When the tree 60 is detected by the sensor 50, a distance value to the tree is determined and input to the PLC. A predetermined tree distance value from the potentiometer 94 is programmed into the PLC, and a comparison is then conducted within the PLC to determine how far the tree is from the present location of the shaker head 22. Now, with the engine RPM at the appropriate level, the shaker head hydraulic valve system 124, 128 is activated to cause the shaker head 22 to move outwardly upon the boom 30 towards the tree 60. Additional distance to the tree determinations and comparisons are made within the PLC as the shaker head moves towards the tree. As is depicted in FIG. 5, the shaker head 22, with the pads 38 separated, moves outwardly until the tree 60 is properly located between the pads 38; that is, until the distance comparison indicates that the sensor signal distance value to the tree is less than or equal to the predetermined tree distance value. At this point the shaker head motion is stopped by the PLC control of the shaker head hydraulic system. In a preferred harvester 10, the pads 38 have a length of approximately 20 inches and the desired tree location is therefore when the tree is approximately centrally located with reference to the pad length. The physical location of the tree sensor, and the physical geometry of the shaker head must therefore be taken into consideration in selecting the predetermined tree distance value.

Figure 6:
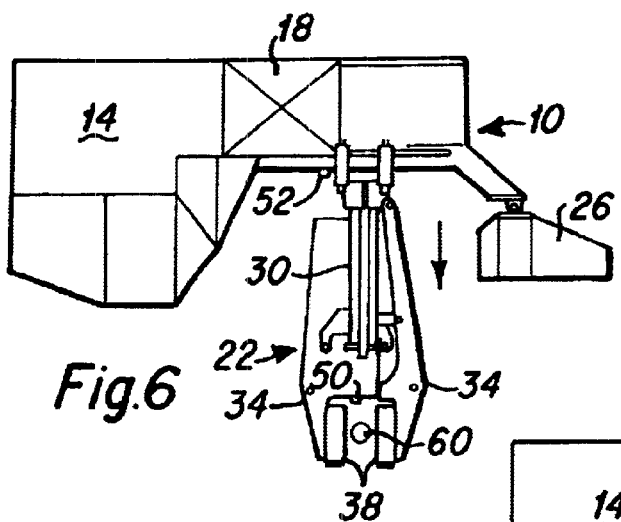

In the next step, as depicted in FIG. 6, the shaker head clamp and shake components 140, 144 and 148 are activated to close the shaker head jaws and clamp the tree. The clamping pressure is monitored 86 by inputs to the PLC to be sure that proper predetermined clamping pressure from potentiometer 104 is obtained and maintained during the tree shaking process that follows. If the clamping pressure is to light, the tree shaking pads may damage the tree by tearing the tree bark away. Once the proper tree clamping pressure is obtained, the tree shaking motor 148 of the shaker head 22 is activated by a signal from the PLC, and tree shaking is conducted . The shaking time duration is monitored by PLC and compared to the predetermined shaking time value from potentiometer 112 that has been input into the PLC. The tree shaking is stopped when the tree shaking time is equal to or greater than the predetermined shaking time value, which is generally approximately two seconds.

Figure 7:
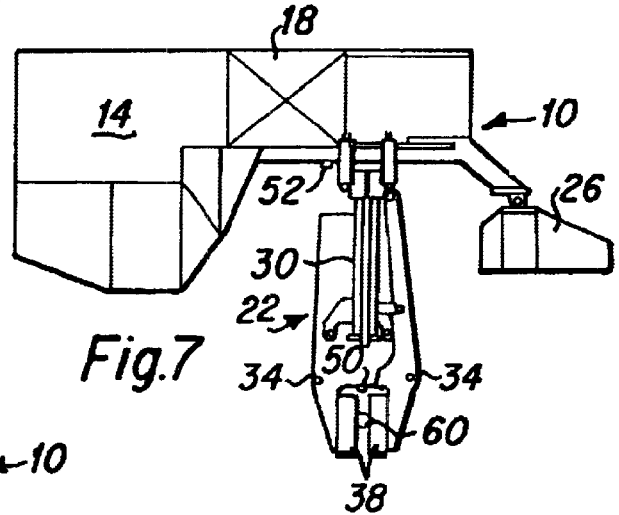
Figure 8:
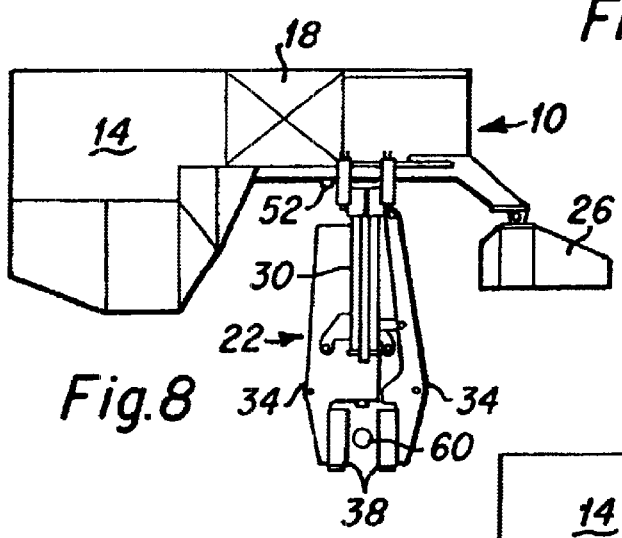
Figure 9:
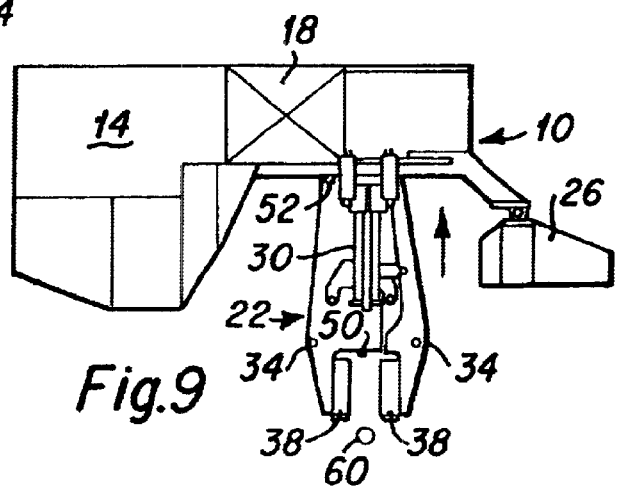

Following the tree clamping and shaking steps, the shaker head is allowed to become stationary for a short time., such as 1.5 seconds. Then, as depicted in FIG. 7, the PLC provides a signal to open the jaws 34 to release the tree. Thereafter, a signal from the PLC to the shaker head hydraulic system 124, 128 causes the retraction of the shaker head back to the body of the harvester. The limit switch 52 is preferably positioned to be tripped when the shaker head returns to its starting position. This signal from the limit switch 52 informs the operator that the automatic tree sensing, clamping and shaking cycle of the present invention has been completed. The operator then activates the engine throttle and drives the harvester 10 towards another tree and positions the harvester with the shaker head open proximate the next tree, as is depicted in FIG. 4, and the automatic tree sensing, clamping and shaking steps of the present invention are again initiated by the operator.

While the invention has been shown and described with reference to particular preferred embodiments, it will be understood by those skilled in the art that various alterations and modifications in form and detail may be made therein. Accordingly, it is intended that the following claims cover all such alterations and modifications as may fall within the true and spirit and scope of the invention.

What is claimed is:

1. A tree harvester, including a tree shaker head comprising:
   a body portion including an engine;
   a shaker head being movably engaged to the body, said shaker head including a pair of tree clamping pads;
   a tree sensing device being mounted upon said tree harvester;
   a programmable logic control device (PLC) being operably engaged with said tree sensing device and being operably engaged with said harvester to provide control signals that cause said shaker head to move towards said tree and to clamp said tree, and to shake said tree, and to unclamp said tree, and to move away from said tree.

2. A tree harvester as described in claim 1, wherein said but with PLC is operably engaged to said engine to control the throttle of said engine.

3. A tree harvester as described in claim 1, wherein said PLC includes a timer to control the time duration of said shaking of the said tree.

4. A tree harvester as described in claim 1, wherein said tree sensing device is disposed upon said shaker head.

5. A tree harvester as described in claim 4 wherein said tree sensing device is disposed between said pads.

6. A tree harvester, including a tree shaker head, comprising:
   a body portion including an engine;
   a shaker head being movably engaged to the body, said shaker head including a pair of tree clamping pads;
   a tree shaking control system being operably engaged with said engine and said shaker head, said control system including:
      a means for sensing a tree;
      a means for determining a distance value to said tree;
      a means for causing said shaker head to move towards said tree;
      a means for causing said shaker head to clamp said tree;
      a means for causing said shaker head to shake said tree;
      a means for causing said shaker head to unclamp said tree;
      a means for causing said shaker head to move away from said tree.

7. A tree harvester as described in claim 6 wherein said control system includes a predetermined tree distance value, and wherein said means for causing said shaker head to move towards said tree includes a means for comparing said predetermined tree distance value with said distance value to said tree.

8. A tree harvester as described in claim 7, wherein said means for causing said shaker head to move towards said tree includes a means for stopping said shaker head movement when said distance value to said tree is equal to or less than said predetermined tree distance value.

9. A tree harvester as described in claim 6 wherein said control system includes a means for controlling the RPM of said engine.

10. A tree harvester as described in claim 6, wherein said control system includes a timer and a predetermined shaking time value, and wherein said means for causing said shaker head to shake said tree includes a means for determining the time duration of said tree shaking, and a means to stop said tree shaking when said time duration of said tree shaking is greater than or equal to said predetermined shaking time value.

11. A tree harvester as described in claim 6, wherein said means for sensing a tree includes an ultrasonic sensing device.

12. A tree harvester as described in claim 6 wherein said means for causing said shaker head to clamp said tree includes a means to control a clamping pressure of said shaker head.

13. A tree harvester as described in claim 6, wherein said control system includes a programmable logic control device (PLC) that receives engine rpm input signal values, and distance value to said tree input signals from said means for sensing a tree, and wherein said PLC includes a predetermined engine RPM value and a predetermined tree distance value, and wherein said PLC outputs a control signal to cause said engine RPM signal values to be approximately equal to said predetermined engine RPM value, and wherein said means for causing said shaker head to move towards said tree includes output control signals from said PLC to cause said shaker head to move outwardly towards said tree until said tree distance input signal is less then or equal to said predetermined distance value to said tree value.

14. A method for harvesting trees utilizing a tree shaking device, comprising:
   inputting a predetermined tree distance value into a control system;
   positioning a harvester including a tree shaker head proximate a tree;
   determining a distance value to said tree and inputting said distance value to said tree into said control system;
   providing control signals from said control system to said shaker head to cause said shaker head to move outwardly towards said tree;
   providing control signals from said control system to stop said outward movement of said shaker head when said distance value to said tree is equal to or less than said predetermined tree distance value;
   providing further control signals to said shaker head to cause said shaker head to clamp said tree, and to shake said tree, and to unclamp said tree, and to move said shaker head away from said tree.

15. A method as described in claim 14 including the further steps of:
   inputting at least one predetermined engine RPM value into said control system;
   providing engine RPM input signal values to said control system;

comparing said engine RPM input signal values with said predetermined engine RPM values and outputting an engine RPM control signal to adjust the engine RPM such that it is approximately equal to said predetermined engine RPM value.

16. A method as described in claim 14 including the further steps of:

inputting a predetermined tree shaking time value into said control system;

providing tree shaking time input signal values to said control system;

comparing said tree shaking time input signal values with said predetermined tree shaking time value and stopping said tree shaking when said tree shaking input signal value is equal to or greater than said predetermined tree shaking time value.

\* \* \* \* \*